(12) United States Patent
Agapiou et al.

(10) Patent No.: US 10,992,212 B2
(45) Date of Patent: Apr. 27, 2021

(54) METHOD OF MANUFACTURING A STATOR

(71) Applicant: GM GLOBAL TECHNOLOGY OPERATIONS LLC, Detroit, MI (US)

(72) Inventors: John S. Agapiou, Rochester Hills, MI (US); Hongliang Wang, Sterling Heights, MI (US); Thomas A. Perry, Bruce Township, MI (US); John D. Campbell, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 245 days.

(21) Appl. No.: 16/176,006

(22) Filed: Oct. 31, 2018

(65) Prior Publication Data

US 2020/0136481 A1    Apr. 30, 2020

(51) Int. Cl.
| | |
|---|---|
| *B23P 19/00* | (2006.01) |
| *H02K 15/06* | (2006.01) |
| *H02K 1/16* | (2006.01) |
| *H02K 3/12* | (2006.01) |
| *H02K 15/02* | (2006.01) |
| *H02K 3/24* | (2006.01) |
| *B60K 6/26* | (2007.10) |

(52) U.S. Cl.
CPC ............ *H02K 15/064* (2013.01); *H02K 1/16* (2013.01); *H02K 3/12* (2013.01); *H02K 3/24* (2013.01); *H02K 15/024* (2013.01); *B60K 6/26* (2013.01); *B60Y 2200/92* (2013.01)

(58) Field of Classification Search
CPC .......... H02K 15/064; H02K 1/16; H02K 3/12; H02K 3/24; H02K 3/345; H02K 15/026; B60K 6/26; Y10T 29/49011; Y10T 29/53157; Y10T 29/53161

USPC ................... 29/597, 598, 732, 735, 736
See application file for complete search history.

(56) References Cited

U.S. PATENT DOCUMENTS

| | | | |
|---|---|---|---|
| 7,135,793 B2 * | 11/2006 | Seguchi | ............ H02K 3/12 310/71 |
| 8,215,000 B2 | 7/2012 | Guercioni | |
| 8,443,509 B1 | 5/2013 | De Souza et al. | |

(Continued)

FOREIGN PATENT DOCUMENTS

DE    102013206532 A1    10/2013

OTHER PUBLICATIONS

Fritz, A. Herbert ; Schulze, Günter (Eds.): Production Engineering, 9th, newly edited edition. Springer, 2010. 21 Pages. (Foreign Reference).

(Continued)

*Primary Examiner* — Donghai D Nguyen
(74) *Attorney, Agent, or Firm* — Cantor Colburn LLP

(57) ABSTRACT

A method for manufacturing a stator includes the steps of: (1) providing a stator core module having a first stator fixture disposed on a first side of the stator core module, the first stator fixture is configured to support a first set of stator core junction portions in a fixed position; (2) providing a first crown module having a set of first crown junction portions and a first crown fixture to support the first set of first crown junction portions; (3) aligning the first stator fixture with the first crown fixture so that the first set of stator core junction portions are aligned with the first crown junction portions; and (4) joining the first set of stator core junction portions with the first crown junction portions.

8 Claims, 12 Drawing Sheets

(56) References Cited

U.S. PATENT DOCUMENTS

| | | |
|---|---|---|
| 9,954,408 B2 * | 4/2018 | Nakamura ............. H02K 3/522 |
| 2007/0147993 A1 | 6/2007 | Lhoest et al. |
| 2010/0325874 A1 | 12/2010 | Wang et al. |
| 2014/0125189 A1 | 5/2014 | Hoemann |
| 2016/0276887 A1 | 9/2016 | Watanabe et al. |
| 2018/0115227 A1 | 4/2018 | Kim |

OTHER PUBLICATIONS

Fritz, A. Herbert ; Schulze, Günter (Eds.): Production Engineering, 9th, newly edited edition. Springer, 2010. 21 Pages. (Machine Translation).

German Office Action from the German Patent and Trademark Office for Application No. 102019114791.3 dated Jan. 31, 2020; 5 Pages.

Machine Translation of German Office Action from the German Patent and Trademark Office for Application No. 102019114791.3 dated Jan. 31, 2020; 5 Pages.

Müller, O. M. "Time-Saving Devices in Mechanical and Apparatus Engineering"; Berlin: Publisher of Julius Springer; 1926; 6 Pages (Foreign Reference).

Müller, O. M. "Time-Saving Devices in Mechanical and Apparatus Engineering"; Berlin: Publisher of Julius Springer; 1926; 6 Pages (Machine Translation).

\* cited by examiner

METHOD OF MANUFACTURING A STATOR

TECHNICAL FIELD

The present disclosure relates to a stator manufacturing method.

BACKGROUND

An electric motor uses electric potential energy to produce mechanical energy through the interaction of magnetic fields and current-carrying conductors. Electric machines may include an element rotatable about a central axis. The rotatable element, which may be referred to as a rotor, may be coaxial with a static element, which may be referred to as a stator. The electric machine uses relative rotation between the rotor and stator to produce mechanical energy or electrical energy.

Stators are traditionally manufactured by manually bending the wires which form the stator cons. First, the wire may be cut to the desired length and stripped, then bent into a hairpin shape on a one at a time basis, then the two legs of the hairpin separated one hairpin at a time and hand inserted into one end of a stator, with the stripped ends of the wires sticking out of the other end of the stator being all bent all in one row uniformly in one direction and all in the adjacent row uniformly bent in the opposite direction so interconnection of wires in the two rows forming a given phase could be welded, one at a time, to provide the stator windings. However, to bring out the connections to the phases, and to interconnect phases, the corresponding wires needed to be re-bent to isolate them from the connections within each phase, something again previously done by hand.

SUMMARY

The present disclosure provides an improved method for manufacturing a stator. In a first embodiment, the method includes the steps of: (1) providing a stator core module having a first stator fixture on a first side of the stator core module (the first stator fixture is configured to support a first set of stator core junction portions in a fixed position); (2) providing a first crown having a set of first crown junction portions and a first crown fixture to support the first set of first crown junction portions; (3) aligning the first stator fixture with the first crown fixture so that the first set of stator core junction portions are aligned with the first crown junction portions; and (4) joining the first set of stator core junction portions with the first crown junction portions. The foregoing method may further include the optional step of simultaneously miffing the first set of stator core junction portions and the first crown junction portions with a single blade just before joining the first set of stator core junction portions with the first crown junction portions. Regardless of whether the ends of the first set of stator core junction portions and the first crown junction portions are milled, the foregoing method may further include the step of providing a brazing disc between the aligned first stator fixture with the first crown fixture so that the first set of stator core junction portions with the first crown junction portions are joined via a brazing process. The brazing disc may be provided to supply the necessary filler material needed when joining the aligned first crown junction portions with the aligned first set of stator core junction portions via a brazing process.

Under the foregoing method, at least one of the first stator fixture and the first crown fixture may optionally be a monolithic component formed from insulating material. When a monolithic component is used for the first stator fixture and/or the first crown fixture, the first stator fixture and/or the first crown fixture may remain part of the final stator assembly. However, it is also understood that that it is also possible that at least one of the first stator fixture and the first crown fixture may be each be formed from a removable inner coil and a removable outer coil such that at least one of the inner coil and the outer coil defines a cooling channel, Under this scenario, the first stator fixture and/or the first crown fixture may be removed from the stator assembly after the joining process is completed. The cooling channel defined in either or both of the inner coil and the outer coil are configured to transfer heat away from the stator module wherein such heat is generated during the joining process (induction welding, brazing, etc.).

In the event that the stator module does not incorporate any coil ends (on both the first side of the stator module and the second side of the stator module), the foregoing method may further include the steps of: Providing a second stator fixture on the second side of the stator core module and providing a second crown having a set of second crown junction portions (the second crown fixture supports the second set of first crown junction portions); Aligning the second stator fixture with the second crown fixture so that the second set of stator core junction portions are aligned with the second crown junction portions; and Joining the second set of stator core junction portions with the second crown junction portions. Under this circumstance, the second stator fixture is configured to support a second set of stator core junction portions in a fixed position. Similarly, under this circumstance, this method may also further include the optional step of simultaneously milling the second set of stator core junction portions and the second crown junction portions with a single blade just before joining the second set of stator core junction portions with the second crown junction portions. Regardless of whether the ends of the second set of stator core junction portions and the second crown junction portions are milled, the foregoing method may further include the step of providing a brazing disc between the aligned second stator fixture with the second crown fixture so that the second set of stator core junction portions with the second crown junction portions are joined via a brazing process. The brazing disc may be provided to supply the necessary filler material needed when joining the aligned first crown junction portions with the aligned first set of stator core junction portions via a brazing process.

Under the foregoing method which implements the additional steps of providing a second crown module together with the second crown fixture, it is understood that at least one of the second stator fixture and/or the second crown fixture may optionally be a monolithic component formed from insulating material. When a monolithic component is used for the second stator fixture and/or the second crown fixture, the second stator fixture and/or the second crown fixture may remain part of the final stator assembly. However, it is also understood that that it is also possible that at least one of the second stator fixture and/or the second crown fixture may be formed from a removable inner coil and a removable outer coil such that at least one of the inner coil and the outer coil defines a cooling channel. Under this circumstance, the second stator fixture and/or the second crown fixture may be removed from the stator assembly after the joining process is completed. Moreover, the cooling channel defined in either or both of the inner coil and the outer coil are configured to transfer heat away from the stator module wherein such heat is generated during the joining process (induction welding, brazing, etc.).

In yet another embodiment of the present disclosure, a method for manufacturing a modular stator may include the steps of: (1) providing a stator core module having a first stator fixture, the first stator fixture is configured to support a first set of stator core junction portions in a fixed position; (2) providing a first crown having a set of first crown junction portions and a first crown fixture to support the first set of first crown junction portions; (3) aligning the first stator fixture with the first crown fixture so that the first set of stator core junction portions are aligned with the first crown junction portions; (4) welding the first set of stator core junction portions with the first crown junction portions while simultaneously transferring away heat from the welding process via a plurality of cooling channels defined in at least one of the first stator fixture and the first crown fixture.

The foregoing method may optionally include the additional steps of: (1) providing a second stator fixture disposed on a second side of the stator core module; (2) providing a second crown having a set of second crown junction portions and a second crown fixture to support the set of second crown junction portions; (3) aligning the second stator fixture with the second crown fixture so that the second set of stator core junction portions are aligned with the second crown junction portions; and (4) welding the second set of stator core junction portions with the second crown junction portions while simultaneously transferring away heat from the welding process via a plurality of cooling channels defined in at least one of the second stator fixture and the second crown fixture.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Figure 1:
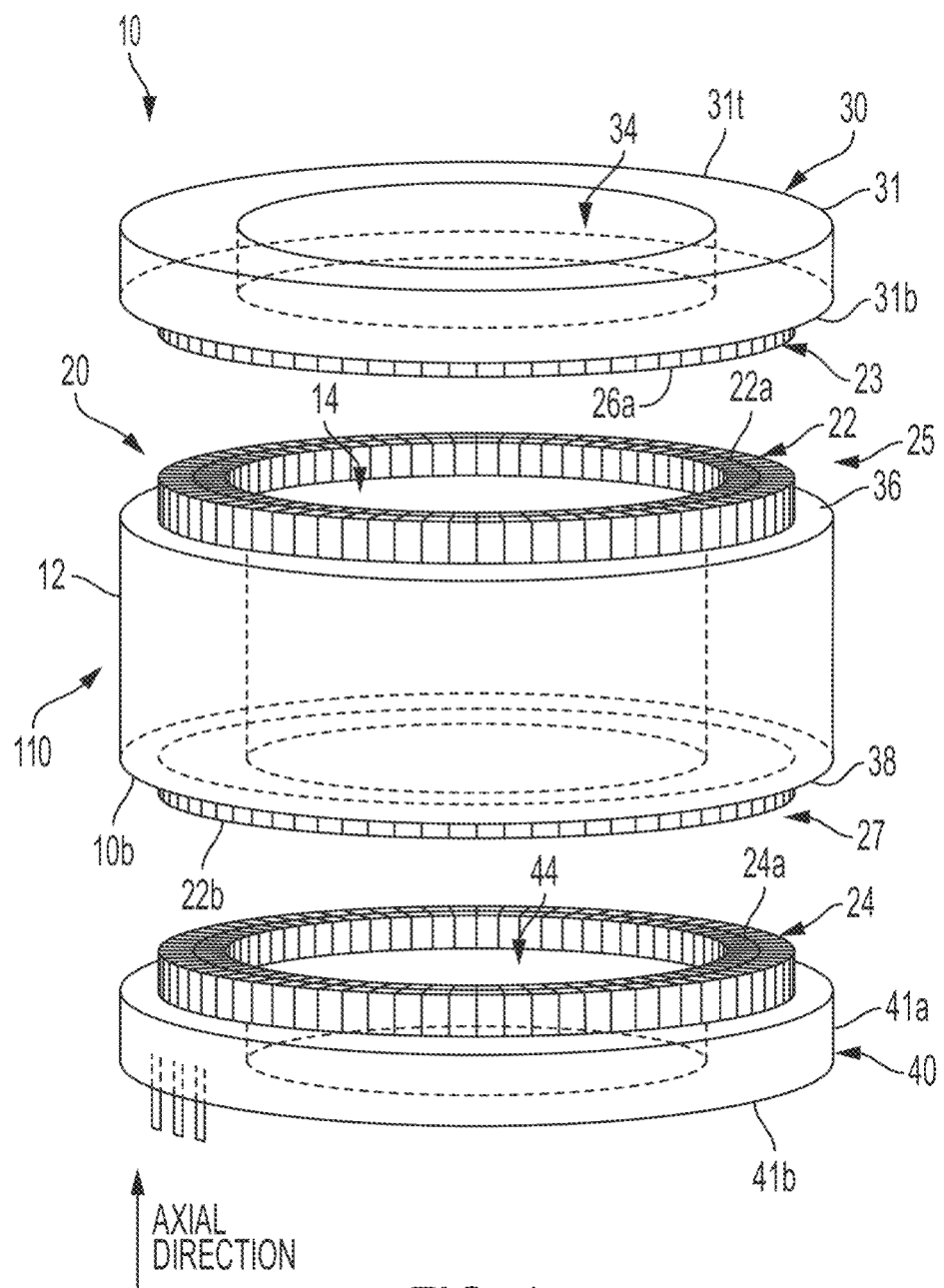
FIG. 1 illustrates an expanded view of the modular stator assembly which is assembled according to the present disclosure.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, un-recited elements or method steps.

The phrase "consisting of" excludes any element, step, or ingredient not specified in the claim. The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Figure 2A:
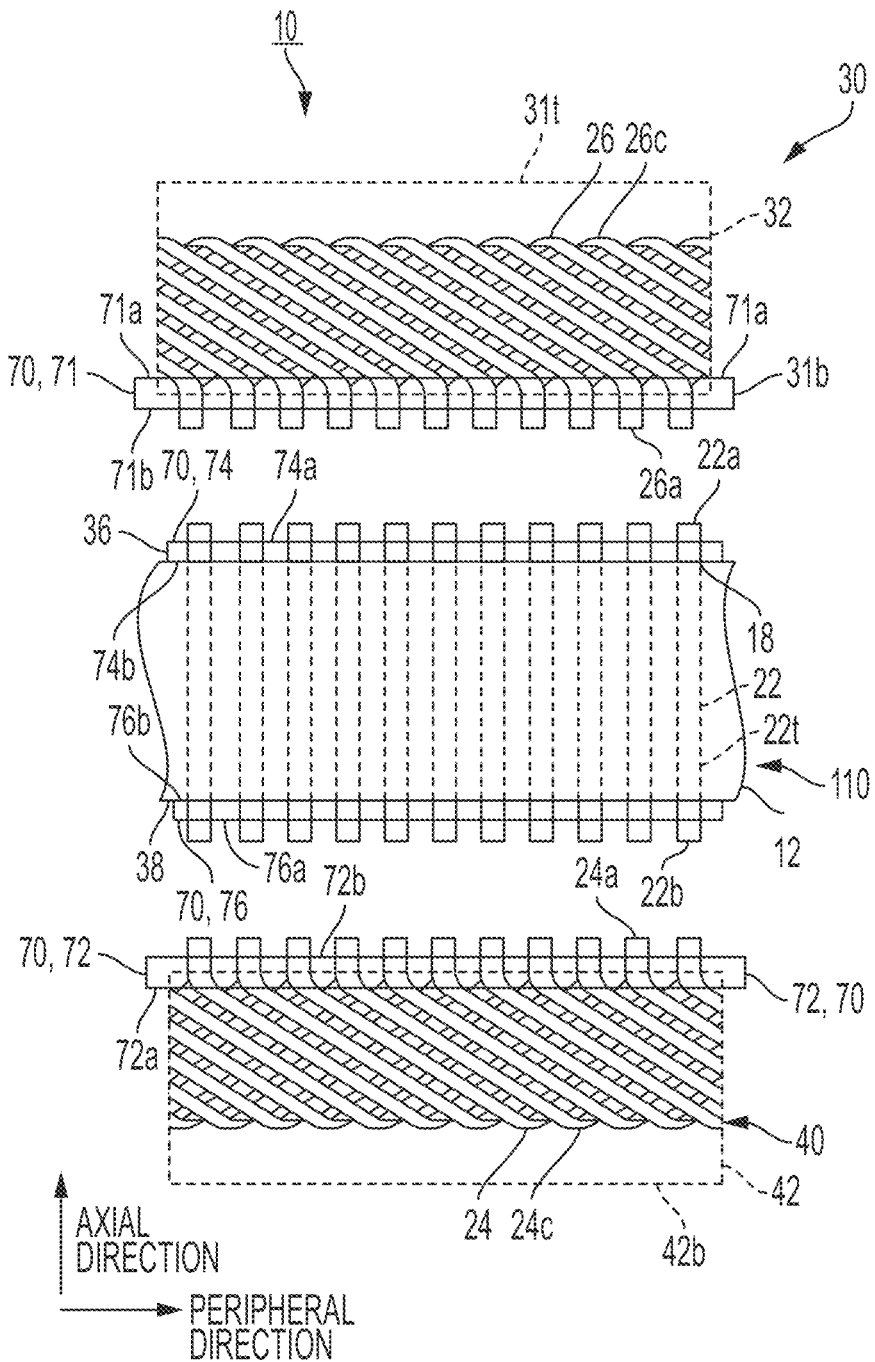
FIG. 2A illustrates a schematic view of the modular stator assembly before stator core module is joined to either the first crown module and/or the second crown module.
Figure 10:
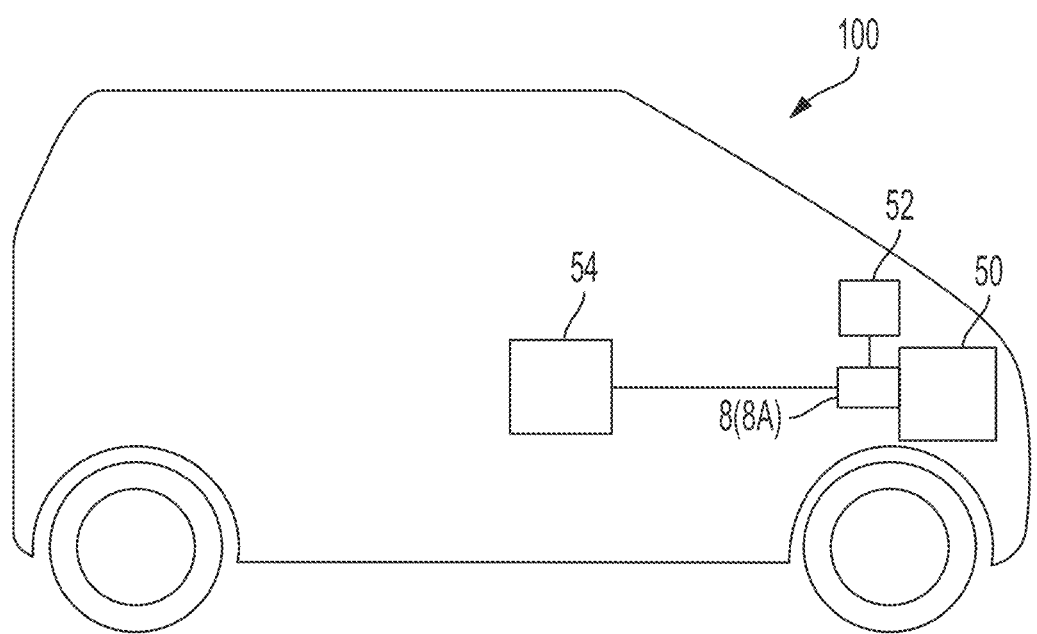
FIG. 10 illustrates a schematic view of a vehicle having a modular stator assembly.

A stator 10 of a rotating electric machine 8 (FIG. 10) according to the present disclosure is equipped with coils 20 that are interconnected through distributed winding onto a stator core 12 of a rotating electric machine 8, (See FIGS. 1, 2A, and 10). This stator 10 is formed by a stator core module 110 and at least the first crown module 30. The stator core module 110 includes a stator core 12 (FIGS. 1, 3, 4) wherein individual parts of linear conductor portions 22 of coils 20 are disposed in slots 18 (FIG. 4), It is understood that the stator core 12 (formed by the laminations) and the coils 20 are collectively referred to as the stator 10 (which may or may not include both crowns). The stator 10 and the rotor form the electric machine 8 (FIG. 10).

On a first side 36 of the stator core module 110, a plurality of first stator core junction portions 22a extend away from the first side 36 of the stator core module 110. The first crown module includes an insulating mold 32 in the shape of a cylinder wherein coil end portions 26 are molded or embedded within the insulating mold 32. The coil end portions 26 of the first crown module 30 are included in the first crown module such that the first crown junction portions (ends) 26a of the coil end portions 26 protrude out of the insulating mold 32 for the first crown module 30. The stator 10 has a structure wherein the first stator core junction portions 22a and the first crown junction portions (ends) 26a are joined as the first crown module 30 is joined to the stator core module 110. With respect to the foregoing structure and method, it is understood that the stator core module 110 may or may not include coil end portions 24 at or proximate to the second side of the stator core module 110. Therefore, the stator 10 of the rotating electric machine 8, includes a stator core module 110 and one (or two) crown modules wherein coil end portions of the stator coils may be embedded in a crown module. In the present invention, the stator core 12 has either one or two crowns (first crown module 30 or both the first and second crowns 30, 40) depending on whether the stator core module 110 incorporates coil end portions 24 at or proximate to the second side 38 of the stator core module 110. In the event two crown modules 30, 40 are implemented, the stator core module 110 is disposed between the first crown module 30 and the second crown module 40—as shown in FIGS. 1 and 2A.

Figure 2B:
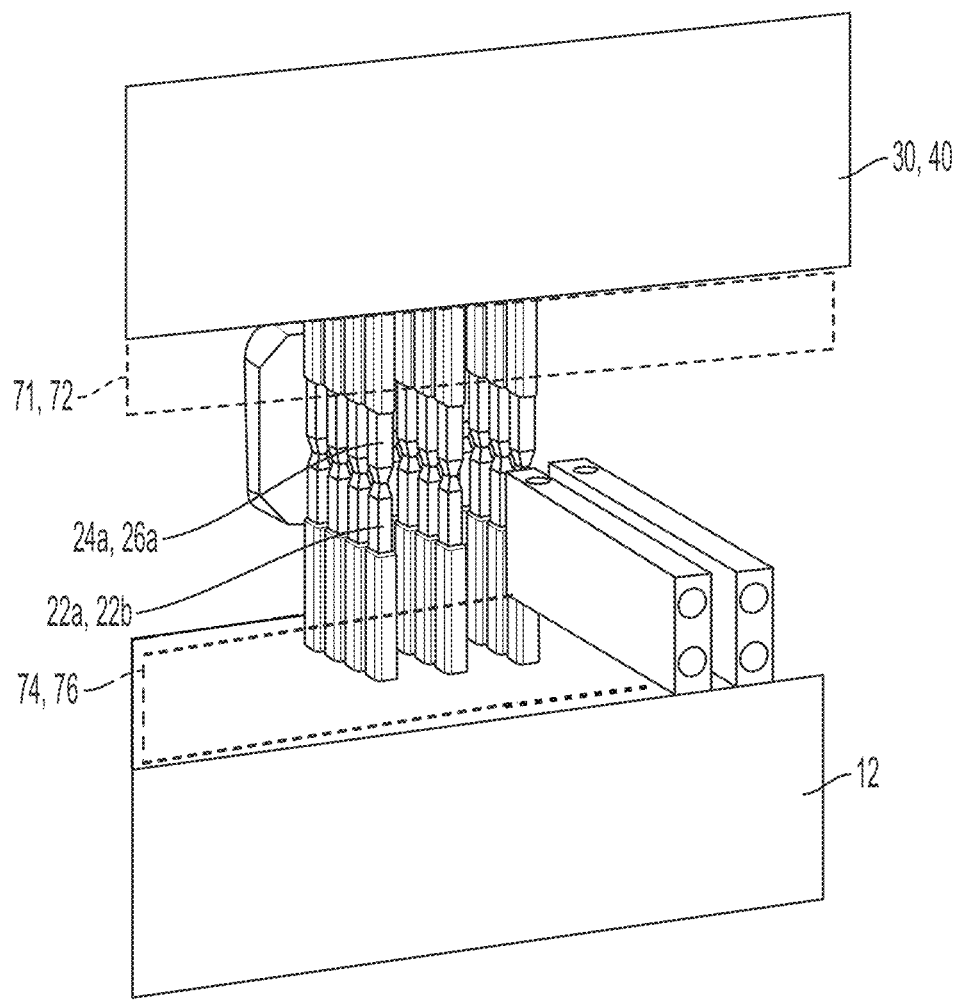
FIG. 2B illustrates an enlarged view of the crown junction portions aligned with the stator core junction portions together with the welding tool.
Figure 2C:
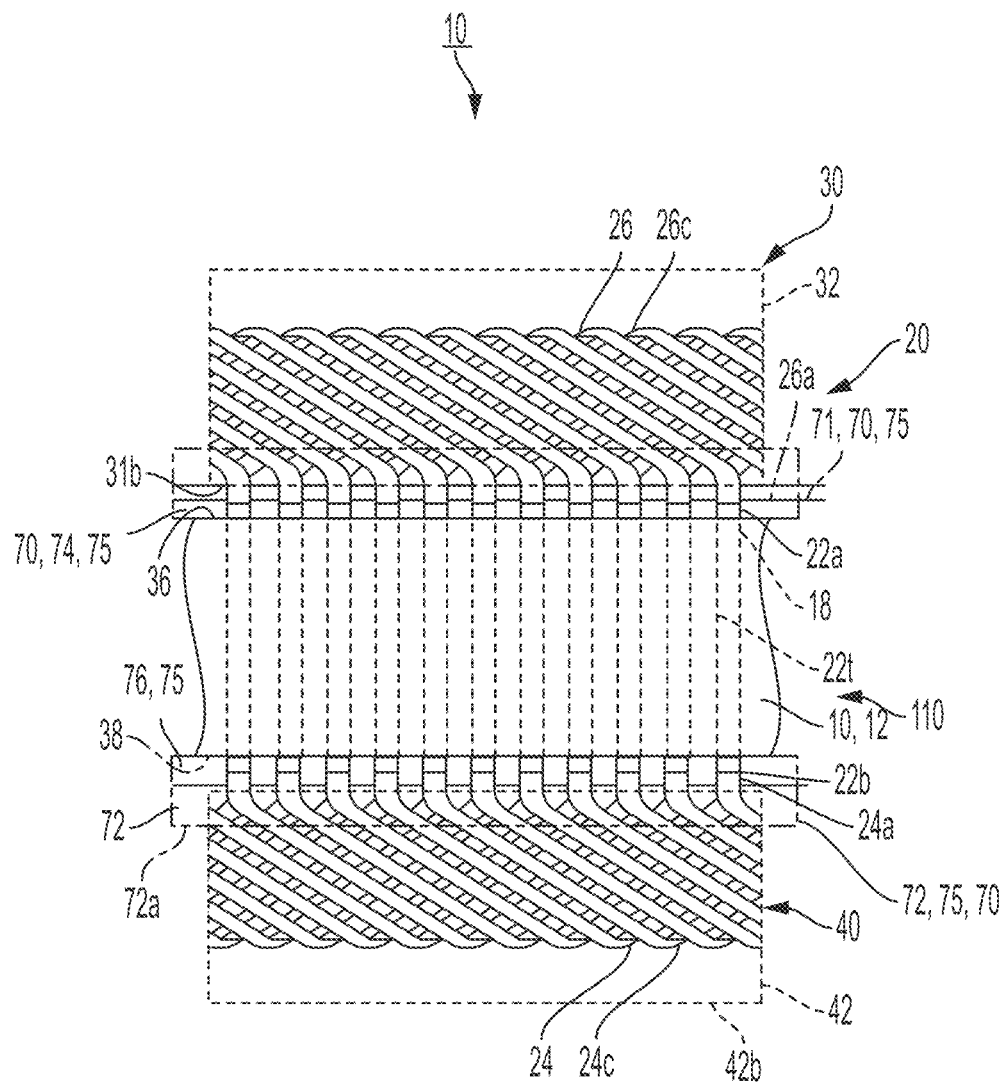
FIG. 2C illustrates a schematic view of the modular stator assembly after stator core module is joined to both the first crown module and the second crown module.
Figure 2D:
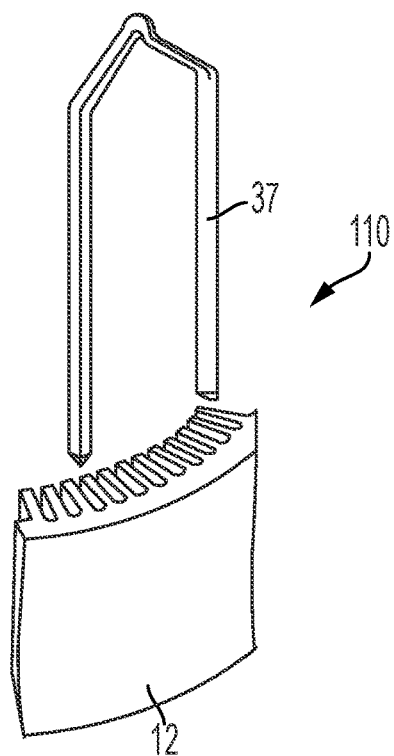
FIG. 2D illustrates an expanded view of a stator core having a hairpin coil.
Figure 3:
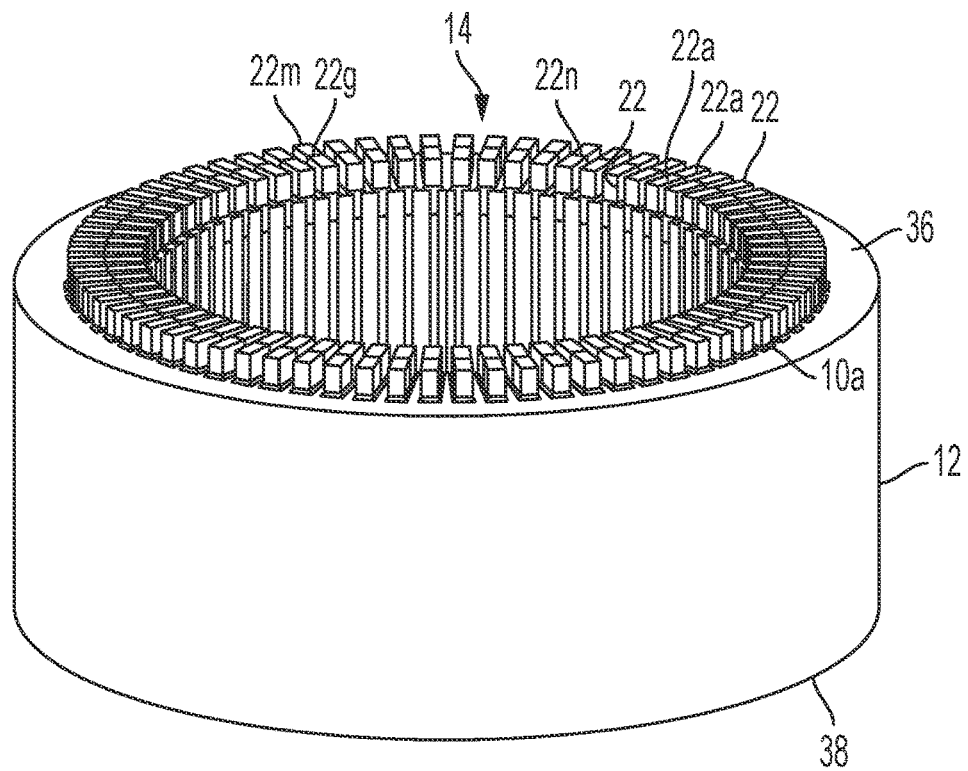
FIG. 3 illustrates a front view of the stator core module.
Figure 4:
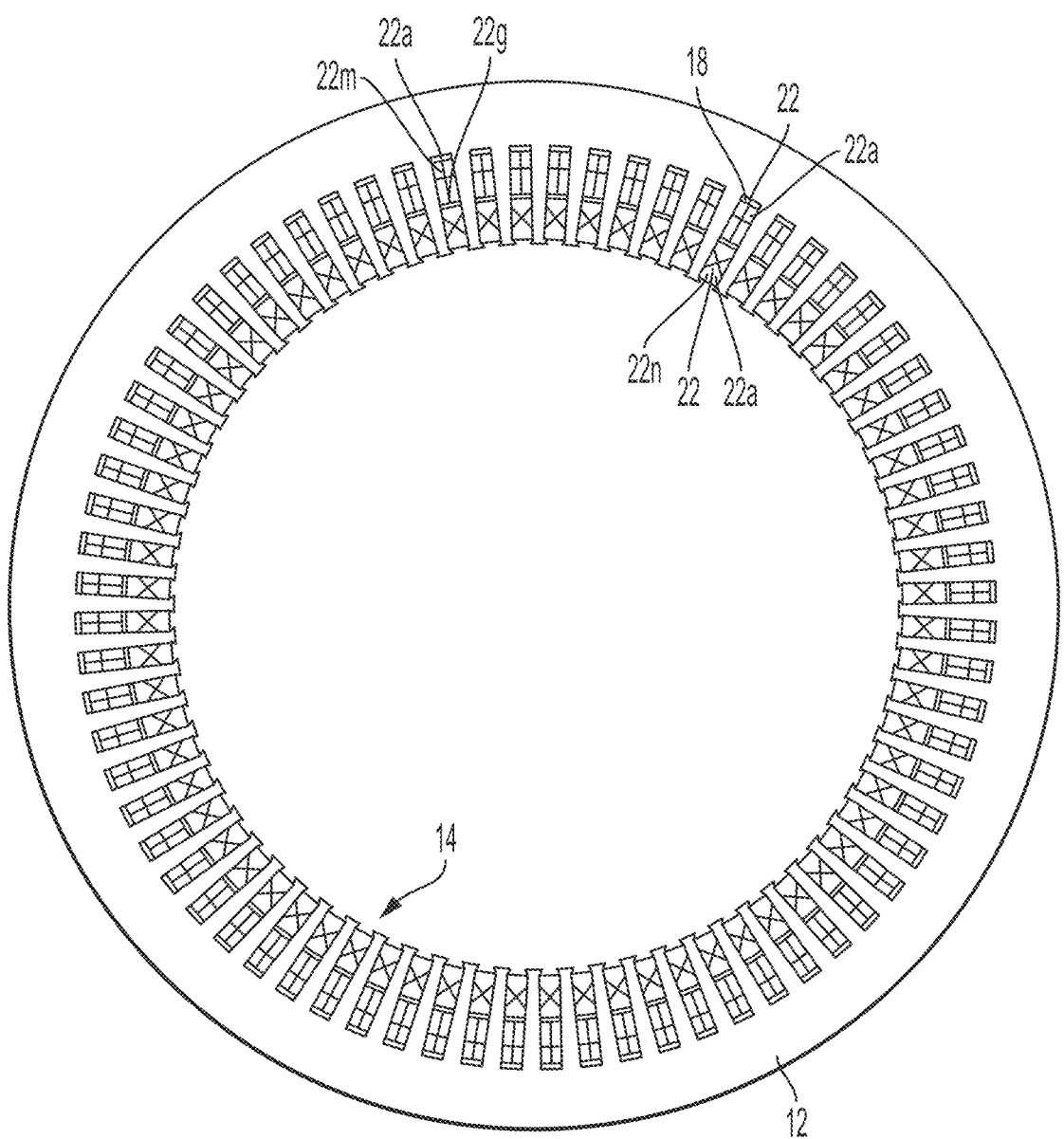
FIG. 4 illustrates a plan view of the stator core module in FIG. 3.

In one non-limiting embodiment, the stator core module 110 has a stator core 12 and a plurality of linear conductor portions 22 as shown in FIGS. 1-2B. The stator core 12 is formed in a round cylindrical shape that is provided with a hole portion 14, along the axial direction, in the center portion thereof, with a plurality of slots 18 formed in the vicinity of the inner peripheral portion as shown in FIGS. 3 and 4. One region 22t (FIG. 2A) of a linear conductor portion 22 of a coil is disposed in a slot 18. The linear conductor portion may not necessarily include a coil end as shown in FIGS. 2A and 2C. However, the linear conductor portion 22 may be part of a hairpin coil 37 as shown in FIG. 2D. Regardless, the linear conductor portion 22 of the stator core module 110 is provided with a junction portion 22a which protrudes from the first side 36 of the stator core 12. In the event the linear conductor portion 22 is not part of a hair pin coil 37 (see FIGS. 2A and 2C) the stator core module 110 may further include a junction portion 22b at a conductor end portion that extends away from the second side 38) of the stator core 12.

The first crown module 30 may be disposed above the stator core module 110 (as shown in FIG. 1). The first crown module 30 may be composed of an insulating mold 32 having a cylindrical shape wherein the first coil end portions 26 are embedded or molded within the insulating mold 32. The insulating mold 32 may, but not necessarily, be formed from a resin. As indicated, the first crown module 30 may be formed in a round cylindrical shape, and, specifically, is provided with a hole portion 34 extending along the axial direction from the center portion of the outer crown surface 31t (the top end portion) to the center portion of the interfacing crown surface 31b (the bottom end portion). The coil end portions 26 in the first crown module 30 is provided with a plurality of first crown junction portions 26a which extend away from the interfacing crown surface 31b (the bottom end portion) of the insulator mold 32 of the first crown module 30. The first crown junction portions 26a of the first crown module 30 are joined to the corresponding first stator core junction portions 22a of the stator core module 110.

In the present example, a first crown fixture 71 (70), may be disposed in the vicinity of the junction portions 26a in the first crown module 30 at the interfacing crown surface 31b, This first crown fixture 71 (70) functions as an electrically insulating member at the time of fusing of the respective junction portions, and as an insulating member between neighboring coils. The first crown fixture 71 also functions to secure the first crown junction portions 26a in position and to aid the alignment of the first crown junction portions 26a with the first stator core junction portions 22a. When a first crown module 30 and the first crown fixture 71 are implemented, a first stator fixture 74 is also implemented. The first stator fixture 74 may be disposed in the vicinity of the junction portions 22a in the stator core module 110 at the first side 36. This first stator fixture 74 (70) functions as an electrically insulating member at the time of fusing of the respective junction portions, and as an insulating member between neighboring coils. The first stator fixture 74 also functions to secure the first stator junction portions 22a in position and to aid the alignment of the first crown junction portions 26a with the first stator core junction portions 22a. Again, in the event the stator core module 110 incorporates hair pin coils 37, only one crown module 30 is required. However, where the stator core module 110 does not include any hair pin coils 37, then a second crown module 40 is implemented.

The second crown module 40 may be disposed below the stator core module 110 (as shown in FIG. 1). The second crown module 40 may include an insulator mold 42 in a round cylindrical shape wherein a plurality of coil end portions 24 are embedded or molded in the insulator mold 42. This second crown module 40 may define a hole portion 44 extending along the axial direction from the center portion of the top surface 42*a* of the second crown module 40 to the center portion of the bottom surface 42*b* of the second crown module 40. The coil end portions 24 of the second crown module 40 are each provided with junction portions 24*a* which extend away from the interfacing surface 42*a* of the second crown module 40. These junction portions 24*a* of the second crown module 40 are joined to the corresponding junction portions 22*b* of the stator core module 110.

In the present example, a second crown fixture 72 (70), is disposed in the vicinity of the junction portions 24*a* such that junction portions 24*a* extend through apertures in the second crown fixture 72. The junction portions 24*a* therefore protrude out of the second crown fixture 72. This second crown fixture 72 (70), functions as an electrically insulating member at the time of fusing of the respective junction portions, and as an insulating member between neighboring coils. Note that the second crown fixture 72 (70) may, but not necessarily, be monolithically molded from the same material as the insulator 42. Moreover, in the present example, a plurality of terminals 9, that are connected electrically to the coils, are disposed protruding from the outer surface 42*b* of the second crown module 40. A rotor (not shown) of the rotating electric machine may be disposed in the hole portion 34 of the first crown module 30, the hole portion 14 of the stator core module 110, and the hole portion 44 of the second crown module 40.

When a second crown module 40 and the second crown fixture 72 are implemented, a second stator fixture 76 is also implemented. The second stator fixture 76 may be disposed in the vicinity of the junction portions 22*b* in the stator core module 110 at the second side 38. This second stator fixture 76 (70) functions as an electrically insulating member at the time of fusing of the respective junction portions, and as an insulating member between neighboring coils. The second stator fixture 76 also functions to secure the second stator junction portions 22*b* in position, and to aid the alignment of the second crown junction portions 24*a* with the second stator core junction portions 22*b*.

The first crown module 30 (and the second crown module 40 where hair pin coils 37 are not implemented) may be assembled to the stator core module 110 to form the stator 10. A stator core module 110 includes a stator core 12 wherein individual parts of the linear conductor portions of the coils are disposed in slots 18. An example of a structure for a stator core module 110 will be explained in detail next. The stator core 12 is formed into a round cylindrical shape, and a hole portion 14 is provided in the center portion thereof, where a plurality of slots 18 that pass through, in the axial direction, is provided in the vicinity of the inner peripheral portion thereof. These slots 18 are formed at prescribed intervals along the circumferential direction of the inner periphery of the stator core 12. Moreover, these slots 18 are formed radiating in the radial direction.

A linear conductor portion 22 may be a rectangular wire which has a rectangular cross-section (a flat rectangular cross-section) which is inserted into, and held in, each of these slots 18. (See FIGS. 2A and 2D). Specifically, respective linear conductor portions 22 may be provided on the inner peripheral side and the outer peripheral side in each of these slots 18. The stator core junction portions 22*a*, 22*b* at the end portions of the linear conductor portion 22 are disposed so as to protrude from the first side 36 (and second side 38) of the stator core 12, and gaps 22*g* are formed between each of the junction portions 22*a*, 22*b*.

Figure 5:
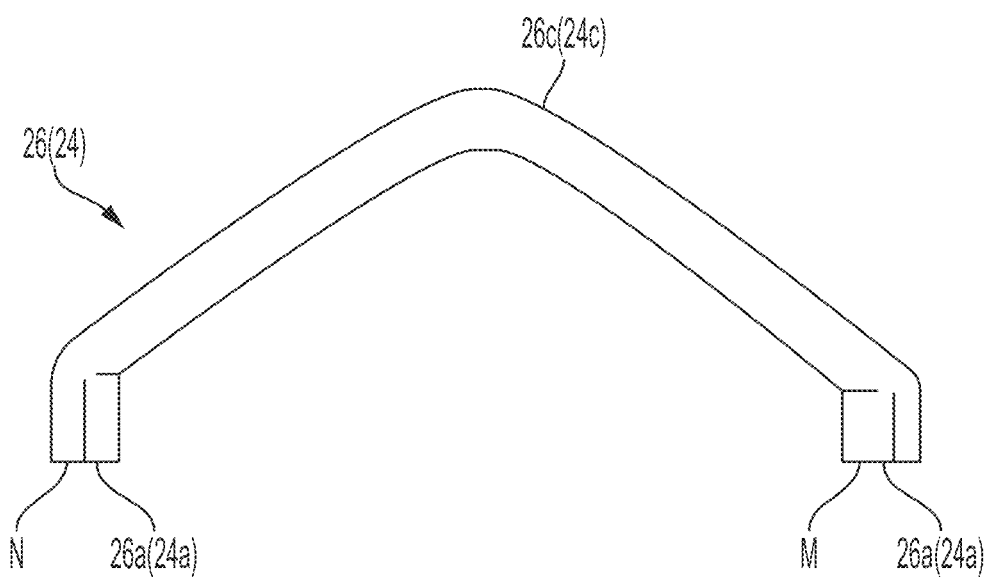
FIG. 5 illustrates an example coil end portion which is disposed in a (first or second) crown module.

An example of the structure of the crown will be explained in detail next. FIG. 5 is a diagram illustrating an example of a conductor portion at the crown. FIGS. 2A and 2C illustrate an example of a crown. The first crown module 30 may be composed of an insulating mold 32 having a cylindrical shape wherein the first coil end portions 26 are embedded or molded within the insulating mold 32. The molded section could have channels molded internal around the perimeter of the crown for cooling the stator (during operation in the car) by extracting heat from the crown section of the coils. Similarly, the second crown module 40 may include an insulator mold 42 in a round cylindrical shape wherein a plurality of coil end portions 24 are embedded or molded in the insulator mold 42. The insulator mold 32 (42), such as resin, is formed into a round cylindrical shape, and a hole portion 34 (44) is formed therein. The coil end portions of the coils, as illustrated in FIG. 5, has a bent conductor portion 26*c* (24*c*), and a junction portion 26*a* (24*a*) is formed at the conductor end portion of the bent conductor portion 26*c* (24*c*). In the present example, the bent conductor portion 26*c* (24*c*) is formed with a circular cross-sectional shape, but it may instead be formed with a rectangular cross-sectional shape. The junction portion 26*a* (24*a*) is formed in a rectangular cross-sectional shape. Each of the junction portions 26*a* (24*a*) is disposed in a respective position corresponding to a junction portion of the stator core module 110. Specifically, the junction portions 26*a* (24*a*) are disposed in two rows as shown in FIG. 6, on the inner peripheral side and the outer peripheral side at prescribed intervals along the circumferential direction of the inner periphery of the cylindrical insulator mold 32 (42).

Figure 6:
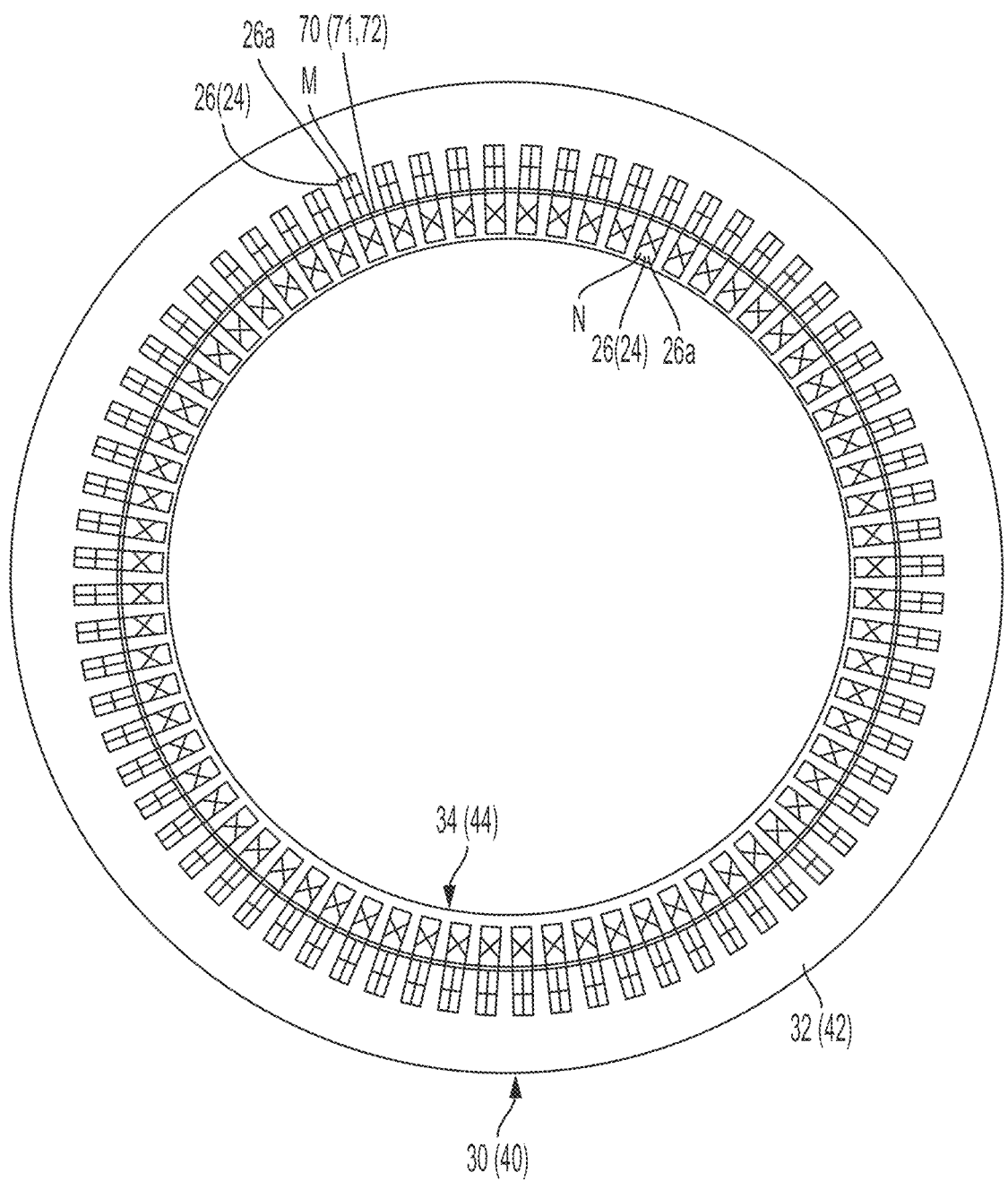
FIG. 6 illustrates an example plan view of a (first or second) crown module.
Figure 7:
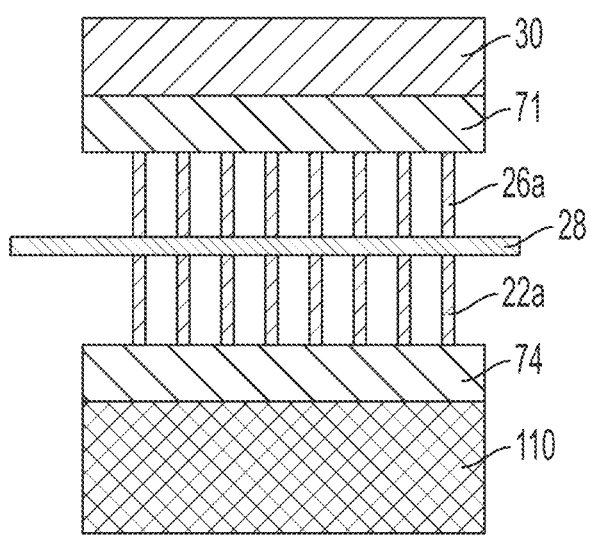
FIG. 7 illustrates optional step of simultaneously miffing the crown junction portions aligned with the stator core junction portions.
Figure 8A:
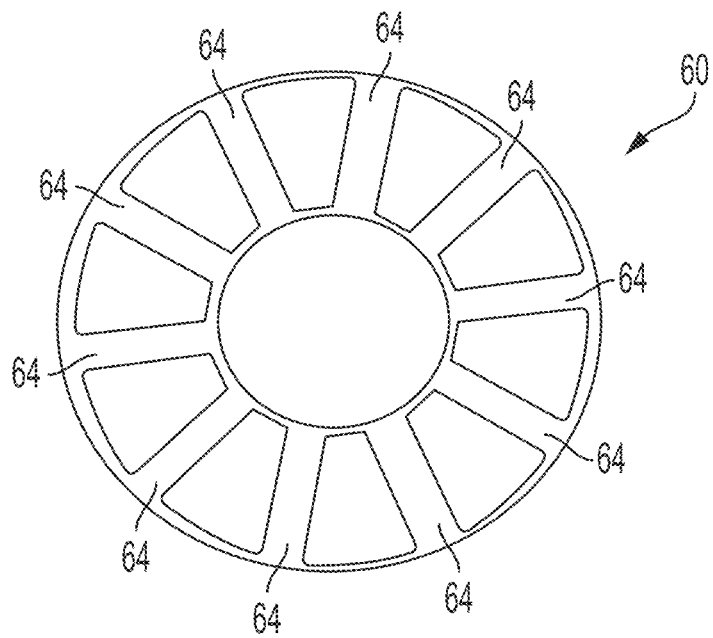
FIG. 8A illustrates the brazing disc used in the brazing/joining step shown in FIG. 8B.
Figure 8B:
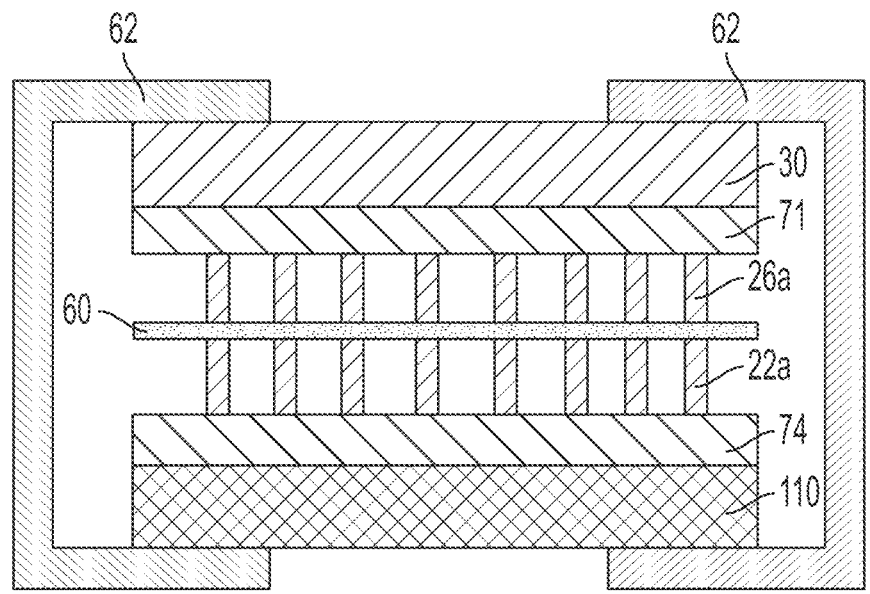
FIG. 8B illustrates the step of brazing the crown junction portions together with the aligned with the stator core junction portions.

Specifically, with reference to FIG. 6, the junction portions M (FIG. 5) on one end of the coil end portions 26 (24) are disposed on the outer peripheral side, and the other junction portions N (FIG. 5) are disposed on the inner peripheral side, and are connected electrically by the bent conductor portions 26*c* (24*c*), In the present example, the junction portions N of the bent conductor portions 26*c* (24*c*) are positioned on the inner peripheral side at positions nine steps away, in the circumferential direction, using the junction portions M that are disposed at prescribed positions on the outer peripheral side as a reference. Note that the positions of the junction portions N and the junction portions M are specified in accordance with the winding aspect of the coils.

In a first embodiment method of manufacturing a stator, the method includes the steps of: (1) providing a stator core module 110 having a first stator fixture 74, the first stator fixture 74 is configured to support a first set of stator core junction portions 22*a* in a fixed position; (2) providing a first crown module 30 having a set of first crown junction portions 26*a* and a first crown fixture 71 to support the first set of first crown junction portions 26*a*; (3) aligning the first stator fixture 74 with the first crown fixture 71 so that the first set of stator core junction portions 22*a* are aligned with the first crown junction portions 26*a*; and (4) joining the first set of stator core junction portions 22*a* with the first crown junction portions 26*a*. The foregoing method may further include the step of simultaneously milling the first set of stator core junction portions 22*a* and the first crown junction portions 26*a* with a single blade 28 just before joining the first set of stator core junction portions 22*a* with the first crown junction portions 26*a*. Regardless of whether the ends of the first set of stator core junction portions 22*a* and the first crown junction portions 26*a* are milled, the foregoing method may further include the step of providing a brazing disc 60 between the aligned first stator fixture 74 with the first crown fixture 71 so that the first set of stator core junction portions 22*a* with the first crown junction portions 26a are joined via a brazing process. The brazing disc 60 provides the necessary filler material 64 in the regions between the first set of stator core junction portions 22a with the first crown junction portions 26a when the brazing disc 60 is positioned between the first stator fixture 74 with the first crown fixture 71.

Figure 9A:
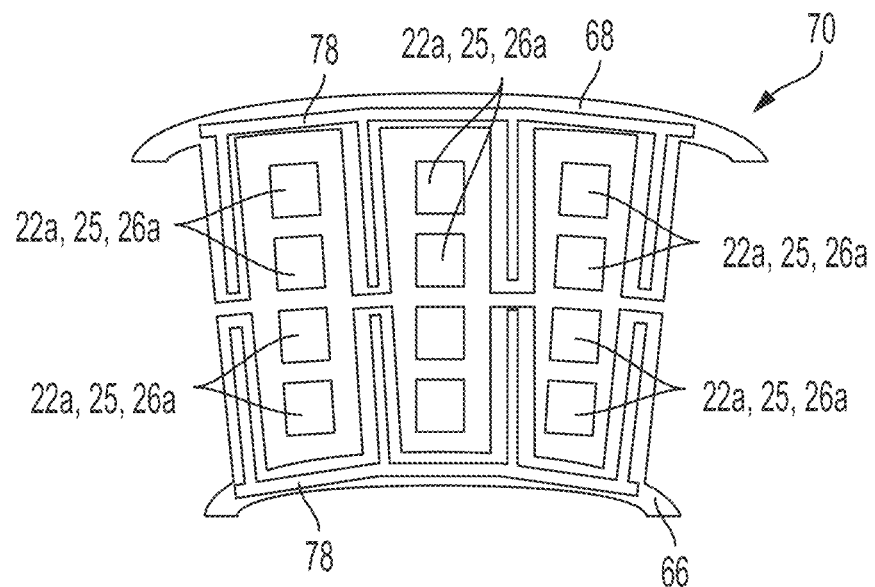
FIG. 9A illustrates a first example of a two-piece fixture for the stator module and/or a crown.
Figure 9B:
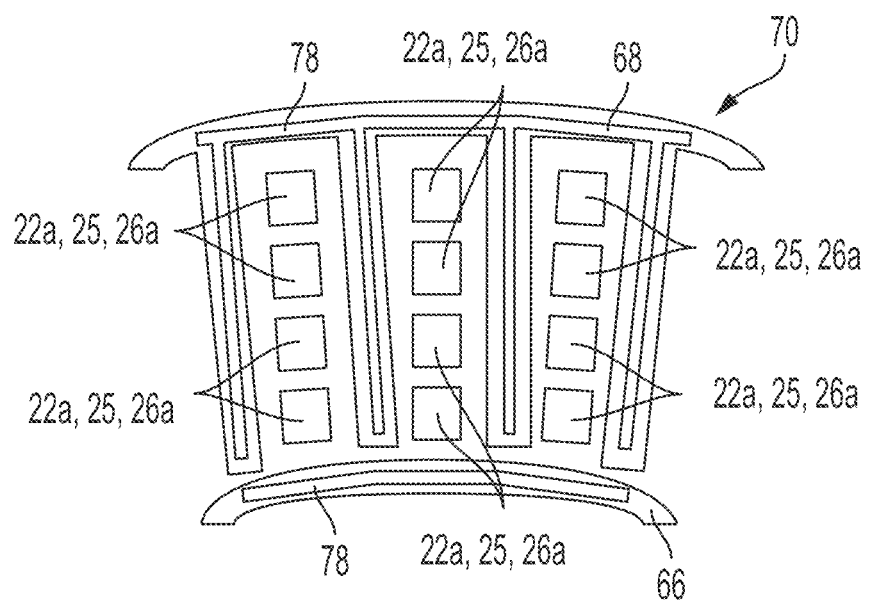
FIG. 9B illustrates a second example of a two-piece fixture for the stator module and/or a crown.

Under the foregoing method, at least one of the first stator fixture 74 and the first crown fixture 71 may optionally be a monolithic component 75 formed from an insulating material such as a resin. When a monolithic component is used for the first stator fixture 74 and/or the first crown fixture 71, the first stator fixture 74 and/or the first crown fixture 71 may remain part of the final stator assembly. However, referring now to FIGS. 9A-9B, it is also understood that that it is also possible that at least one of the first stator fixture 74 and/or the first crown fixture 71 may be each be formed from a removable inner coil 66 and a removable outer coil 68 such that at least one of the removable inner coil 66 and outer coil 68 defines a cooling channel 78. Under this scenario, the first stator fixture 74 and/or the first crown fixture 71 may be removed from the stator assembly after the joining process is completed. The cooling channel 78 defined in either or both of the inner coil 66 and the outer coil 68 is configured to transfer heat away from the junction portions 22, 24, 26 wherein such heat is generated during the joining process (induction welding, brazing, etc.).

The alignment of the molded section 10 with the stator 20 could be also accomplished using locating features within the stator lamination perimeter 36 and the outer perimeter of the molded crown 31. It could be a hole and a dowel or even the same features utilized to mount the stator in a housing. In this case, a spacer could be utilize between the crown mold 10 and the stator 20 to control the distance of the exposed coils to perform the welding process accurately and provide stiffness to the assembly if it is necessary for its functionality. Sometimes. The stator has multiple ears to be mounted in a housing. These ears can be also utilized for alignment of the crown mold 10 to the stator 20. Furthermore, the alignment can be made using external feature(s) on the stator 20 outer perimeter (such as a slot) are utilized with similar shape feature(s) in the crown mold 10. Such features are using with the fixtures 71 and 74 to align the mold 10 to stator 20 to make sure coil 26a is align to coil 22a during the assembly.

The foregoing method may further include the steps of: Providing a second stator fixture 76 on the stator core module 110 and providing a second crown module 40 having a set of second crown junction portions 24a and a second crown fixture 72 to support the second set of first crown junction portions 26a; Aligning the second stator fixture 76 with the second crown fixture 72 so that the second set of stator core junction portions 22b are aligned with the second crown junction portions 24a; and Joining the second set of stator core junction portions 22b with the second crown junction portions 24a. Under this circumstance, the second stator fixture 76 is configured to support a second set of stator core junction portions 22b in a fixed position and to help align the second set of stator core junction portions 22b with the set of second crown junction portions 24a, The second stator fixture 76 also electrically insulates the stator module 110 when the second set of stator core junction portions 22b are joined to the set of second crown junction portions 24a.

Similarly, under this circumstance, this method may also further include the step of simultaneously miffing the second set of stator core junction portions 22b and the second crown junction portions 24a with a single blade 28 just before joining the second set of stator core junction portions 22b with the second crown junction portions 24a. Regardless of whether the ends of the second set of stator core junction portions 22b and the second crown junction portions 24a are milled, the foregoing method may further include the step of providing a brazing disc 60 between the aligned second stator fixture 76 with the second crown fixture 72 so that the second set of stator core junction portions 22b with the second crown junction portions 24a are joined via a brazing process. The brazing disc 60 includes filler material 64 which is disposed between the second set of stator core junction portions 22b and the second crown junction portions 24a when the brazing disc 60 is positioned between the second stator fixture 76 with the second crown fixture 72.

Under the foregoing method, at least one of the second stator fixture 76 and the second crown fixture 72 may optionally be a monolithic component 75 formed from insulating material. When a monolithic component is used for the second stator fixture 76 and/or the second crown fixture 72, the second stator fixture 76 and/or the second crown fixture 72 may remain part of the final stator assembly. However, it is also understood that that it is also possible that at least one of the second stator fixture 76 and the second crown fixture 72 may be formed from a removable inner coil 66 and a removable outer coil 68 such that at least one of the inner coil 66 and the outer coil 68 defines a cooling channel 78. Under this circumstance, the second stator fixture 76 and/or the second crown fixture 72 may be easily removed from the stator assembly after the joining process is completed given that each fixture 72, 76 may be disassembled as two separate components. The cooling channel 78 defined in either or both of the inner coil 66 and the outer coil 68 are configured to transfer heat away from welded joint 25 wherein such heat is generated during the joining process (induction welding, brazing, etc.).

In yet another embodiment of the present disclosure, a method for manufacturing a modular stator 10 may include the steps of: (1) providing a stator core module 110 having a first stator fixture 74 on the first side of the stator core module 110, the first stator fixture 74 is configured to support a first set of stator core junction portions 22a in a fixed position; (2) providing a first crown having a set of first crown junction portions 26a and a first crown fixture 71 to support the first set of first crown junction portions 26a; (3) aligning the first stator fixture 74 with the first crown fixture 71 so that the first set of stator core junction portions 22a are aligned with the first crown junction portions 26a; (4) welding the first set of stator core junction portions 22a with the first crown junction portions 26a while simultaneously transferring away heat from the welding process via a plurality of cooling channels defined in at least one of the first stator fixture 74 and the first crown fixture 71.

The foregoing method may optionally include the additional steps of: (1) providing a second stator fixture 76 disposed on a second side of the stator core module 110; (2) providing a second crown having a set of second crown junction portions 24a and a second crown fixture 72 to support the set of second crown junction portions 24a; (3) aligning the second stator fixture 76 with the second crown fixture 72 so that the second set of stator core junction portions 22b are aligned with the second crown junction portions 24a; and (4) welding the second set of stator core junction portions 22b with the second crown junction portions 24a while simultaneously transferring away heat from the welded joint 25 via a plurality of cooling channels 78 defined in at least one of the second stator fixture 76 and the second crown fixture 72. With respect to all embodiments in the present disclosure, it is understood that the fixtures 70 used with the stator module 110 and/or crowns 30, 40 align the junction portions 22, 24, 26 and also function to electrically insulate the junction portions 22, 24, 26 during the joining process.

FIG. 10 is a conceptual diagram for explaining an example of a vehicle equipped with the rotating electric machine according to the example according to the present invention. The rotating electric machine 8 (8A) has a stator wherein the coils set forth above are disposed in distributed winding on page stator core, and a rotor (not shown), and the like. The vehicle 100 is provided with a rotating electric machine 8. Specifically, the vehicle 100, illustrated in FIG. 10, has an engine 50, a first battery 52, such as a lead battery, or the like, a secondary battery 54, such as a lithium ion battery, or the like, that is provided if necessary, a rotating electric machine 8 (8A), and so forth. The engine 50 and the rotor of the rotating electric machine 8 (8A) are connected by power transmitting means, such as a belt, so as to enable transmission of power therebetween. The first battery 52 and the secondary battery 54 are connected electrically to the rotating electric machine 8 (8A).

In the present example, the rotating electric machine 8 (8A) may be used as an electric power generator with a motor function. The stator is small, and thus the rotating electric machine 8 (8A) may be small as well. In the rotating electric machine 8 (8A), the rotor is rotated by the power of the engine, to generate electric power, which quickly charges the battery. When the engine 50 is started up (or restarted), the rotating electric machine 8 (8A) functions as a high-power starter. Moreover, when the vehicle accelerates, the rotating electric machine 8 (8A) provides motorized assistance to the engine 50. Note that the vehicle 100 and the rotating electric machine 8 (8A) are not limited to the example set forth above.

Therefore, as explained above, the stator 10 according to the example according to the present invention has coils that are interconnected in a distributed winding on the stator core 12 of the rotating electric machine 8. In the present example, the stator 10 has a coil group 20 comprising a plurality of coils. The stator 10 has a stator core module 110 that comprises a stator core 12 wherein individual parts of linear conductor portions 22 of coils are disposed in slots 18, and a first crown module 30 (40) wherein the end portions of the coils are formed through insulator molding. Each linear conductor portion 22 of the stator core module 110 is provided with a junction portion 22a (22b) as a first junction portion at the conductor end portion that is disposed protruding from the stator core 12 toward the first crown module 30 (40) side. Each coil end portion of the first crown module 30 (40) is provided with a junction portion 26a (24a) as a second junction portion at the conductor end portion disposed protruding from the end portion of the insulator mold toward the stator core module 110 side. The stator 10 has a structure wherein the junction portions 22a (22b), as stator core junction portions toward first crown (22a) are joined with junction portions of first crown (26a), and stator core junction portions toward second crown (22b) are joined with junction portions of second crown (24a). This makes it easy to provide a stator with a simple structure. Moreover, because the coil end portion of the crown 30 (40) has a simple structure, the coil end portion can be formed with a small shape, and the stator is small.

A method for manufacturing a stator according to an example according to the present invention has a step for joining the stator core junction portions 22 of the stator core module 110 and the crown junction portions 24, 26 through fusing. This joining may be joining through a prescribed fusing method, such as soldering, brazing, TIG welding, or the like. TIG welding is an inert gas arc welding method of a non-consumable-electrode type, where tungsten or a tungsten alloy is used in the electrode and argon gas, or the like, is used as a shield gas, to carry out welding while providing protection by isolating the arc and the molten metal from air. As is generally known, brazing is a metal-joining process in which two or more metal items are joined together by melting and flowing a filler metal into the joint, the filler metal having a lower melting point than the adjoining metal. In the present disclosure, the brazing disc provides the filler metal 39 at the joint (in the regions between the stator junction portions 22a, 22b and the crown junction portions 24, 26). Alternatively, a laser, or the like, may be used as the heating source for joining the stator junction portions 22a, 22b to the crown junction portions 24, 26.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for manufacturing a stator comprising the steps of:

providing a stator core module having a first stator fixture disposed on a first side of a stator core module, the first stator fixture is configured to support a first set of stator core junction portions;

providing a first crown module having a set of first crown junction portions and a first crown fixture to support the first set of first crown junction portions;

aligning the first stator fixture with the first crown fixture so that the first set of stator core junction portions are aligned with the first crown junction portions;

joining the first set of stator core junction portions with the first crown junction portions; and simultaneously milling the first set of stator core junction portions and the first crown junction portions with a single blade just before joining the first set of stator core junction portions with the first crown junction portions.

2. The method for manufacturing a stator as defined in claim 1 further comprising the step of providing a brazing disc between first set of stator core junction portions with the first crown junction portions milling the first set of stator core junction portions and the first crown junction portions before the first set of stator core junction portions and the first crown junction portions are joined together via a brazing process.

3. The method for manufacturing a stator as defined in claim 2 wherein the brazing disc includes a filler material which is disposed between the first set of stator core junction portions and the first crown junction portions.

4. The method for manufacturing a stator as defined in claim 3 wherein at least one of the first stator fixture and the first crown fixture is a monolithic component formed from an insulating material.

5. The method for manufacturing a stator as defined in claim 3 wherein at least one of the first stator fixture and the first crown fixture is formed from a removable inner coil and a removable outer coil, and at least one of the inner coil and the outer coil defines a cooling channel.

6. A method for manufacturing a stator comprising the steps of:
- providing a stator core module having a first stator fixture disposed on a first side of a stator core module, the first stator fixture is configured to support a first set of stator core junction portions;
- providing a first crown module having a set of first crown junction portions and a first crown fixture to support the first set of first crown junction portions;
- aligning the first stator fixture with the first crown fixture so that the first set of stator core junction portions are aligned with the first crown junction portions;
- joining the first set of stator core junction portions with the first crown junction portions;
- providing a second stator fixture disposed on a second side of the stator core module, the second stator fixture is configured to support a second set of stator core junction portions on the second side;
- providing a second crown module having a set of second crown junction portions and a second crown fixture to support the second set of first crown junction portions;
- aligning the second stator fixture with the second crown fixture so that the second set of stator core junction portions are aligned with the second crown junction portions;
- joining the second set of stator core junction portions with the second crown junction portions; and
- simultaneously milling the second set of stator core junction portions and the second crown junction portions with a single blade just before joining the second set of stator core junction portions with the second crown junction portions.

7. A method for manufacturing a stator comprising the steps of:
- providing a stator core module having a first stator fixture on a first side of the stator core module, the first stator fixture is configured to support a first set of stator core junction portions;
- providing a first crown module having a set of first crown junction portions and a first crown fixture to support the first set of first crown junction portions;
- aligning the first stator fixture with the first crown fixture so that the first set of stator core junction portions are aligned with the first crown junction portions;
- joining the first set of stator core junction portions with the first crown junction portions to form a joint while simultaneously transferring away heat from the joint via a plurality of cooling channels defined in at least one of the first stator fixture and the first crown fixture;
- providing a second stator fixture disposed on a second side of the stator core module;
- providing a second crown module having a set of second crown junction portions and a second crown fixture to support the set of second crown junction portions;
- aligning the second stator fixture with the second crown fixture so that the second set of stator core junction portions are aligned with the second crown junction portions;
- welding the second set of stator core junction portions with the second crown junction portions while simultaneously transferring away heat from the welding process via a plurality of cooling channels defined in at least one of the second stator fixture and the second crown fixture; and
- providing a brazing disc between first set of stator core junction portions and the first crown junction portions after milling the first set of stator core junction portions and the first crown junction portions before the first set of stator core junction portions and the first crown junction portions are joined via a brazing process.

8. The method for manufacturing a stator as defined in claim 7 wherein the brazing disc includes a filler material which is disposed between the first set of stator core junction portions and the first crown junction portions.

* * * * *